(12) United States Patent
Yeo et al.

(10) Patent No.: US 6,628,364 B2
(45) Date of Patent: Sep. 30, 2003

(54) LIQUID CRYSTAL DISPLAY DEVICE AND FABRICATING METHOD THEREOF

(75) Inventors: Ju Chun Yeo, Kyungsangbuk-do (KR); Jae Deok Park, Kyungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 308 days.

(21) Appl. No.: 09/880,130

(22) Filed: Jun. 14, 2001

(65) Prior Publication Data

US 2001/0054998 A1 Dec. 27, 2001

(30) Foreign Application Priority Data

Jun. 15, 2000 (KR) .................................. P2000-33075

(51) Int. Cl.$^7$ ................................................. G02F 1/13
(52) U.S. Cl. ............................................................ 349/151
(58) Field of Search ............................................ 349/151

(56) References Cited

U.S. PATENT DOCUMENTS 6,496,240 B1 * 12/2002 Zhang et al. ................ 349/116
6,515,729 B1 * 2/2003 Hoshino ....................... 349/158

* cited by examiner

Primary Examiner—James A. Dudek
(74) Attorney, Agent, or Firm—Morgan, Lewis & Bockius LLP (57) ABSTRACT

A liquid crystal display device that is capable of preventing metal wires from being corroded during its long-term use under the high temperature and high humidity circumference. In the device, a pad is positioned at a non-display area of a substrate to be connected to at least one of a gate line and a data line. A driving circuit responds to an electrical signal from the pad to drive a liquid crystal pixel cell provided within said non-display area of the substrate. A semiconductor pattern is opposed to the driving circuit with having the pad therebetween to be connected between the pad and the driving circuit.

16 Claims, 6 Drawing Sheets

LIQUID CRYSTAL DISPLAY DEVICE AND FABRICATING METHOD THEREOF

BACKGROUND OF THE INVENTION

1. Field of the Invention

This invention relates to a liquid crystal display, and more particularly to a liquid crystal display device that is capable of preventing metal wires from being corroded during its long-term use under the high temperature and high humidity circumstance. The present invention also is directed to a method of fabricating such a liquid crystal display device.

2. Description of the Related Art

Generally, a liquid crystal display (LCD) of active matrix driving system uses thin film transistors (TFT's) as switching devices to display a natural moving picture. Since such a LCD can be made into a smaller device in size than the existent Brown tube, it has been widely used for a monitor for a personal computer or a notebook computer as well as an office automation equipment such as a copy machine, etc. and a portable equipment such as a cellular phone and a pager, etc.

A method of fabricating such an active matrix LCD is classified into substrate cleaning, substrate patterning, aligning film formation, substrate adhesion/liquid crystal injection, packaging and test processes.

In the substrate cleaning process, a cleaner removes an alien substance on the substrates before and after patterning of the upper and lower substrate.

The substrate patterning process is divided into a step of patterning the upper substrate and a step of patterning the lower substrate. The upper substrate is provided with color filters, a common electrode and a black matrix, etc. The lower substrate is provided with signal wires such as data lines and gate lines, etc. A thin film transistor (TFT) is arranged at each intersection between the data lines and the gate lines. A pixel electrode is formed at each pixel area between the data lines and the gate lines to be connected to a source electrode of the TFT.

In the substrate adhesion/liquid crystal injection process, a step of coating an aligning film on the lower substrate and rubbing it is sequentially followed by a step of adhering the upper substrate to the lower substrate, a liquid crystal injection step and an injection hole sealing step.

In the packaging process, a tape carrier package (TCP) mounted with a gate drive integrated circuit (IC) and a data drive IC, etc. is connected to a pad portion on the substrate.

Finally, in the test process, an operation state of a driver IC chip mounted or patterned on the substrate to drive the gate lines and the data lines is tested so as to detect a bad pixel.

In the LCD device, a metal thin film pattern may be corroded during its fabrication process or during its use. Particularly, a corrosion is liable to be generated at a patterned driver circuit, a pad for testing a driver IC mounted onto the TCP, a shorting bar pattern connected to a gate pad and a data pad or an electrode pad exposed by a grinding of the substrate.

The TFT is divided into an amorphous silicon type and a poly silicon type depending on a kind of material used as its semiconductor layer. The amorphous silicon type TFT has advantages of a relatively good uniformity and a stable characteristic while having a drawback of low electric charge mobility. Also, a use of the amorphous silicon type TFT causes a problem in that the peripheral driving circuits are mounted onto the display panel after being manufactured separately. On the other hand, the poly silicon type TFT has advantages in that, since it has a high electric charge mobility, it is not only easy to increase a pixel density, but also the peripheral driving circuits are directly mounted onto the display panel.

Figure 1:
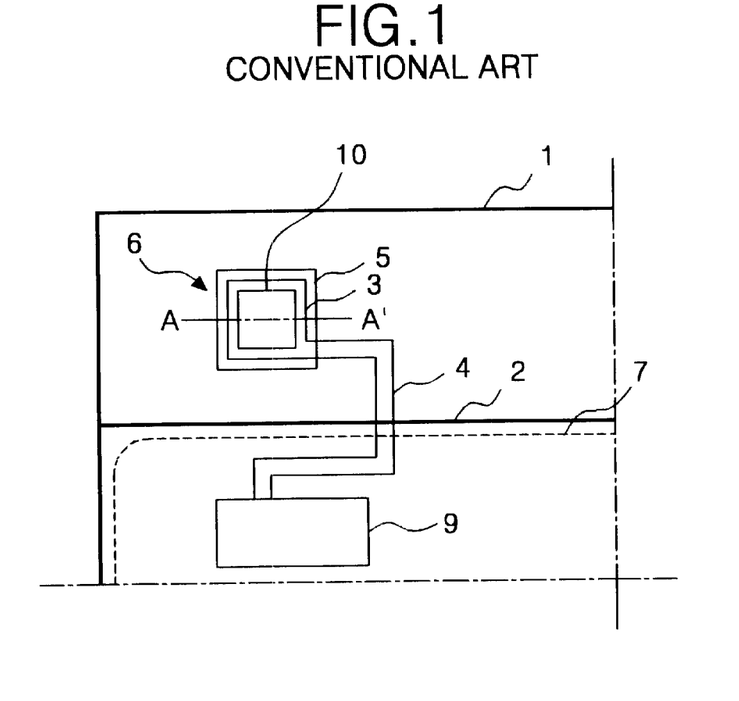
FIG. 1 is a plan view showing a structure of a driver integrated circuit formed on a substrate and a pad connected thereto in a conventional poly silicon type liquid crystal display device.

Referring to FIG. 1, a conventional poly silicon type LCD device includes an upper substrate 2 and a lower substrate 1 joined with each other with having a liquid crystal therebetween, a gate driver IC 9 patterned on the lower substrate 1 to drive a gate line (not shown), and a pad 6 connected, via a link pattern 4, to the gate driver IC 9. The edges of the upper substrate 2 and the lower substrate 1 joined with each other are coated with a seal 7. A liquid crystal is injected into a display area between the upper substrate 2 and the lower substrate 1. A poly silicon layer is formed on the lower substrate 1, and the TFT, the data line, the gate line and the pixel electrode, etc. are disposed thereon.

The gate driver IC 9 is directly patterned on the upper substrate 1 positioned at the inside of the seal 7. The gate driver IC 9 is connected to the gate lines and/or the data lines. The gate driver IC 9 applies a test voltage coupled via the pad 6 and the link pattern 4 to the gate line during the test process.

Figure 2:
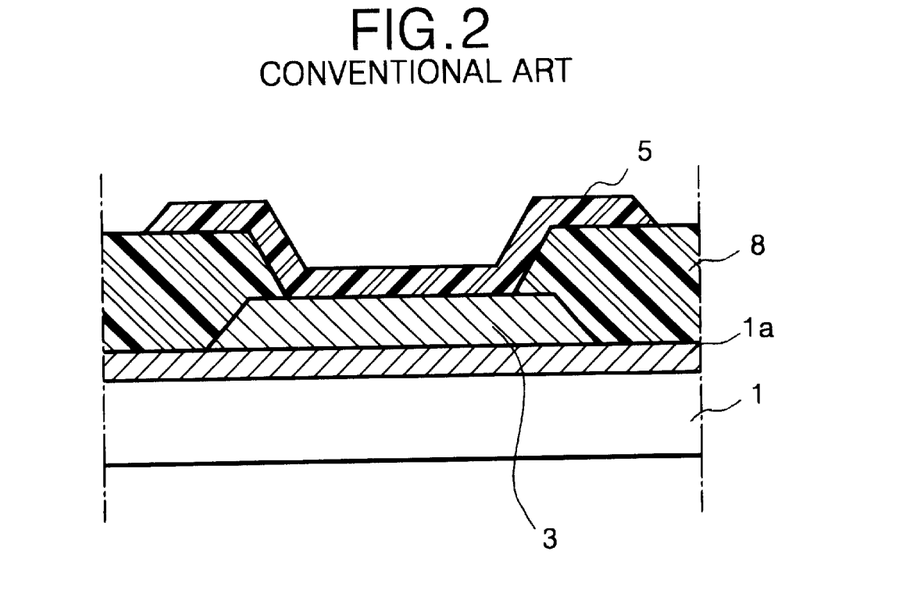
FIG. 2 is a section view of the pad taken along the A–A' line in FIG. 1.

The pad 6 includes a metal thin film pattern 3, and a transparent conductive pattern 5 patterned along with a pixel electrode (not shown). The metal thin film pattern 3 is formed on a gate insulating film 1a made from an inorganic insulating material and is patterned along with source/drain electrodes of the TFT, the data line connected to the source electrode and the link pattern 4 as shown in FIG. 2. The transparent conductive pattern 5 is connected, via a contact hole 10 defined in a passivation layer made from an inorganic insulating material or an organic insulating material, to the metal thin film pattern 3.

A crack or a film stripping may be generated between the metal thin film pattern 3 and the transparent conductive pattern 5 of the pad 6 due to an impact, etc. during the fabrication process of the LCD device. When a crack or a film stripping has been generated between the metal thin film pattern 3 and the transparent conductive pattern 5, moisture is penetrated between the metal thin film pattern 3 and the transparent conductive pattern 5 under the high temperature and high humidity circumstance. If moisture is penetrated between the metal thin film pattern 3 and the transparent conductive pattern 5, then an electrolytic etching reaction occurs between the metal thin film pattern 3 and the transparent conductive pattern 5. As a result, the metal thin film pattern 3 is corroded, and corrosion is progressed into the link pattern 4 and the driver IC 9 with the lapse of time.

Figure 3:
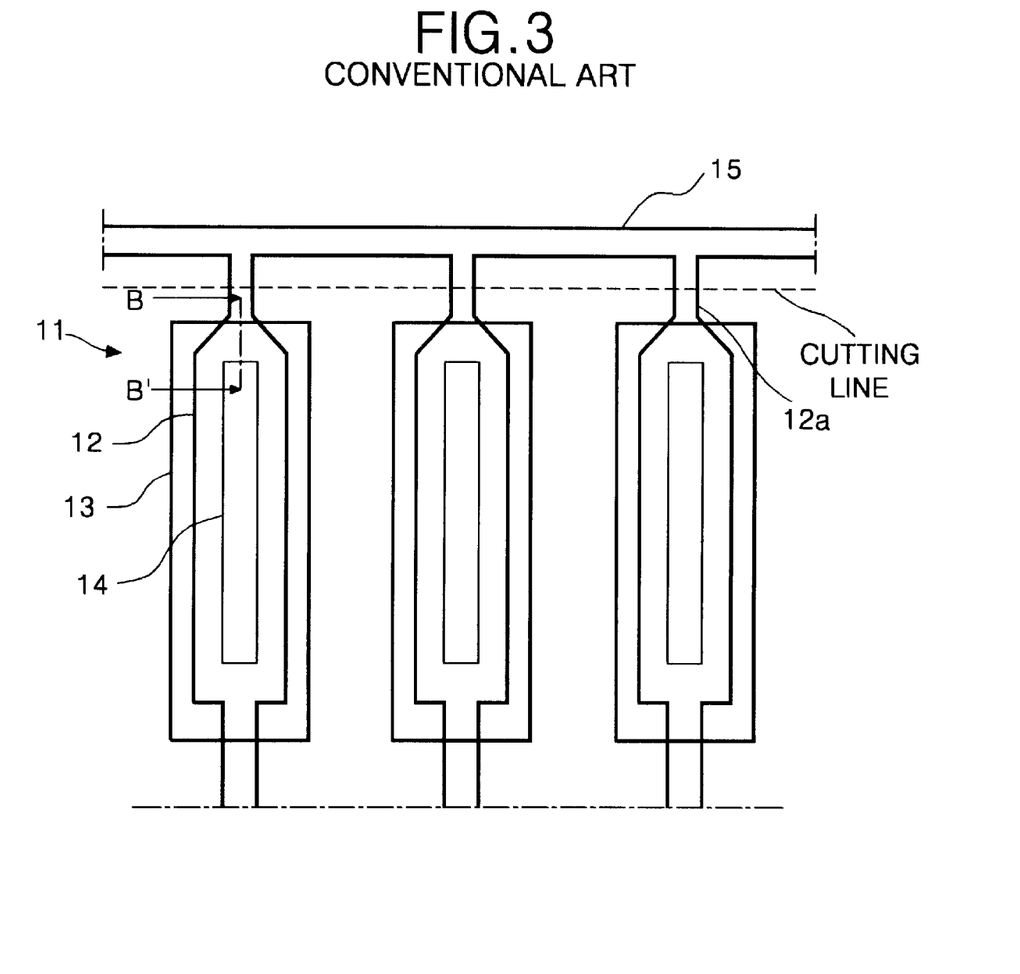
FIG. 3 is a plan view of the pad and the shorting bar in the conventional liquid crystal display device.

Referring to FIG. 3, the conventional LCD device includes a shorting bar 15 commonly connected to a plurality of pads 11. Each pad 11 is connected to the data line or the gate line and includes a metal thin film pattern 12 patterned along with the source/drain electrode and a transparent conductive pattern 13 patterned along with the pixel electrode. The transparent conductive pattern 13 is connected, via a contact hole 14, to the metal thin film pattern 12.

The shorting bar 15 is connected to a ground voltage source GND during the fabrication process to be responsible for removing a static electricity applied to the liquid crystal display panel. The shorting bar 15 is formed from a metal at the edge portion of the lower substrate 1 corresponding to a non-display area. By the substrate scribing process and the grinding process, the shorting bar 15 is removed simultaneously when an unnecessary area at the edge of the lower substrate 1 is removed.

Figure 4:
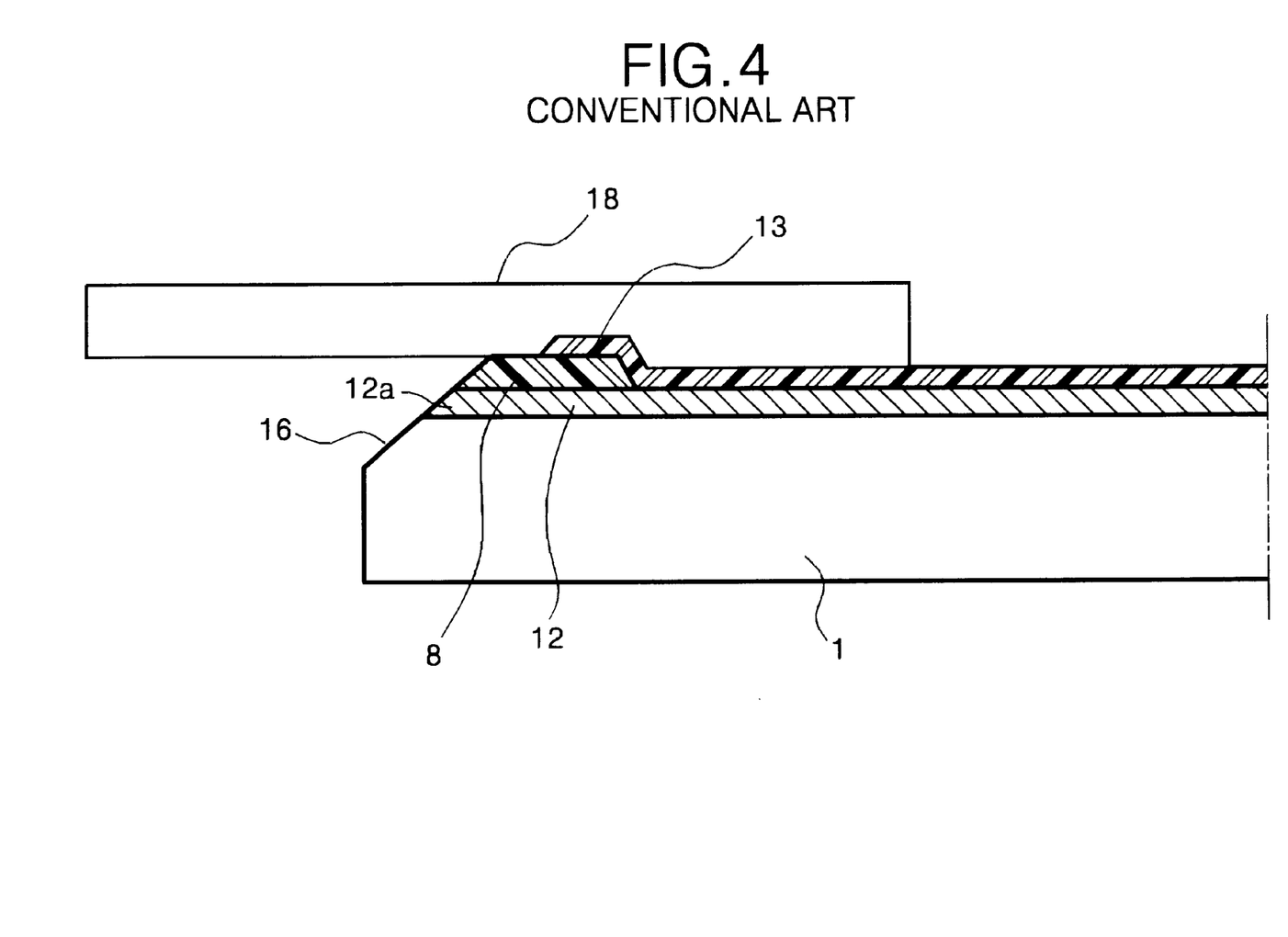
FIG. 4 is a section view of the pad and the shorting bar taken along the B–B' line in FIG. 3.

As shown in FIG. 4, a tape carrier package (TCP) 18 is attached to the pad 11 on the lower substrate 1 by a driver IC packaging technique adopting a tape automated bonding (TAB) system. The TCP 18

The TCP 18 is mounted with a data driver IC (or a gate driver IC) and is provided with input pads and output pads. The input pad of the TCP 18 is connected to a printed circuit board (PCB) (not shown). The output pad of the TCP 18 is connected to the pad 11 on the lower substrate 1. Herein, the input/output pads of the TCP 18 are connected to the PCB and the pads 11 on the lower substrate 1 by an anisotropic conductive film (ACF).

The ground face 16 exists in the side surface of the lower substrate 1 to which the TCP 18 is attached. The ground face 16 is formed by grinding the end of the pad area of the lower substrate 1 using a grinder (not shown) after the substrate scribing process. The end of the metal thin film pattern 12 is exposed onto the ground face 16. The exposed metal thin film pattern 12 is liable to be corroded under the high temperature and high humidity circumference. In other words, since one end at the cutting line side of a metal thin film layer 12a connecting the shorting bar 15 to the metal thin film pattern 12, corrosion is made through the metal thin film layer 12a. Such corrosion is progressed into the metal thin film pattern 12 of the pad 11. With the lapse of time, this corrosion is progressed until the gate line and the data line at the display area.

SUMMARY OF THE INVENTION

Accordingly, it is an object of the present invention to provide a liquid crystal display device that is capable of preventing metal wires from being corroded during its long-term use under the high temperature and high humidity circumference.

In order to achieve these and other objects of the invention, a liquid crystal display device according to one aspect of the present invention includes a pad positioned at a non-display area of a substrate to be connected to at least one of a gate line and a data line; a driving circuit for responding to an electrical signal from the pad to drive a liquid crystal pixel cell provided within said non-display area of the substrate; and a semiconductor pattern opposed to the driving circuit with having the pad therebetween to be connected between the pad and the driving circuit. The driving circuit is a driver integrated circuit connected to at least one of the gate line and the data line to drive any at least one of the gate line and the data line. The semiconductor pattern is formed from a poly silicon layer.

A liquid crystal display device according to another aspect of the present invention includes a plurality of pads connected to at least one of a gate line and a data line provided within a display area of a substrate; and a semiconductor pattern opposed to the gate line and the data line with having the pad therebetween and connected to the pad, said semiconductor pattern having one end exposed at the side surface of the substrate. The liquid crystal display device further includes a shorting bar connected to the semiconductor pattern upon fabrication process of the liquid crystal display device to apply a ground voltage to the gate line and the data line. The shorting bar is removed by a scribing process. The pads are connected to output pads of a tape carrier package mounted with a driver integrated circuit chip.

A method of fabricating a liquid crystal display device according to still another aspect of the present invention includes the steps of forming a pad at a non-display area of a substrate in such a manner to be connected to at least one of a gate line and a data line; forming a driving circuit for responding to an electrical signal from the pad to drive a liquid crystal pixel cell provided within said non-display area of the substrate on the substrate; and forming a semiconductor pattern opposed to the driving circuit with having the pad therebetween to be connected between the pad and the driving circuit on the substrate. The step of forming the semiconductor pattern includes forming a poly silicon layer on the substrate; and patterning the poly silicon layer.

A method of fabricating a liquid crystal display device according to still another aspect of the present invention includes the steps of forming a plurality of pads on a substrate in such a manner to be connected to at least one of a gate line and a data line provided within a display area of a substrate; and forming a semiconductor pattern opposed to the gate line and the data line with having the pad therebetween and connected to the pad and having one end exposed at the side surface of the substrate on the substrate. The above-mentioned method further includes the step of forming a shorting bar pattern connected to the semiconductor pattern to apply a ground voltage to the gate line and the data line at the edge of the substrate; and cutting the substrate along a cutting line set at the inside of the edge of the substrate provided with the shorting bar pattern to thereby remove the shorting bar pattern.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 5:
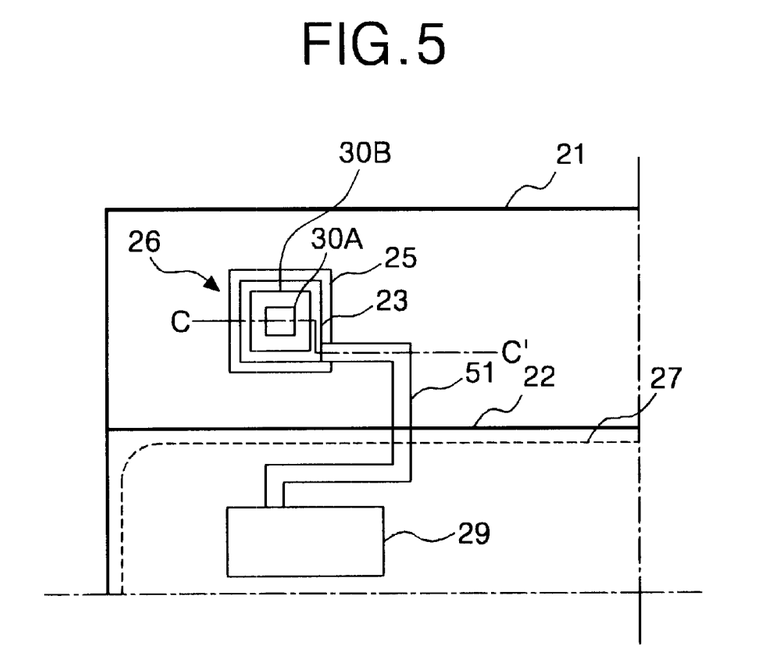
FIG. 5 is a plan view showing a structure of a driver integrated circuit formed on a substrate and a pad connected thereto in a liquid crystal display device according to a first embodiment of the present invention.

Referring to FIG. 5, there is shown a liquid crystal display (LCD) device according to a first embodiment of the present invention. The LCD device includes an upper substrate 22 and a lower substrate 21 joined with each other with having a liquid crystal therebetween, a gate driver IC 29 connected to a gate line, and a pad 26 connected, via a link pattern 51, to the gate driver IC 29. The edges of the upper substrate 22 and the lower substrate 21 joined with each other are coated with a seal 27. A liquid crystal is injected into a display area between the upper substrate 22 and the lower substrate 21. A poly silicon layer is formed on the lower substrate 21, and the TFT, the data line, the gate line and the pixel electrode, etc. are disposed thereon.

The gate driver IC 29 is directly patterned on the upper substrate 21 positioned at the inside of the seal 27. The gate driver IC 29 is connected to the gate lines. The gate driver IC 29 applies a voltage signal coupled via the pad 26 and the link pattern 51 to the gate line during the test process.

Figure 6:
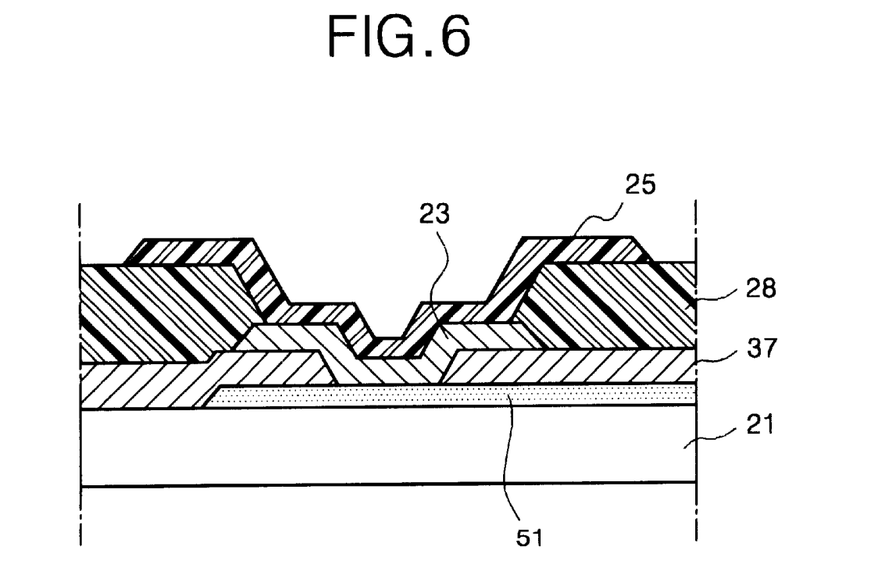
FIG. 6 is a section view of the pad taken along the C–C' line in FIG. 5.

The pad 26 includes a metal thin film pattern 23, and a transparent conductive pattern 25 patterned along with a pixel electrode. As shown in FIG. 6, the metal thin film pattern 23 is formed on a gate insulating film 37 and is patterned along with source/drain electrodes of the TFT and the data line connected to the source electrode. The metal thin film pattern 23 is connected, via a contact hole 30B formed on the gate insulating film 37, to the poly silicon link pattern 51.

The transparent conductive pattern 25 is connected, via a contact hole 30A defined in a passivation layer 28, to the metal thin film pattern 23. The poly silicon link pattern 51 plays a role to deliver an electrical signal applied thereto via the pad 26 into the gate driver IC 29. Further, the poly silicon link pattern 51 also is responsible for shutting off a corrosion path such that corrosion generated at the metal thin film pattern 23 of the pad 26 is not progressed into the gate driver IC 29.

The poly silicon link pattern 51 also is applicable to a liquid crystal display device in which a data driver IC is directly patterned on the lower substrate 21. In other words, the link pattern between the data driver IC patterned on the lower substrate 21 and the pad 26 is made from poly silicon.

Figure 7:
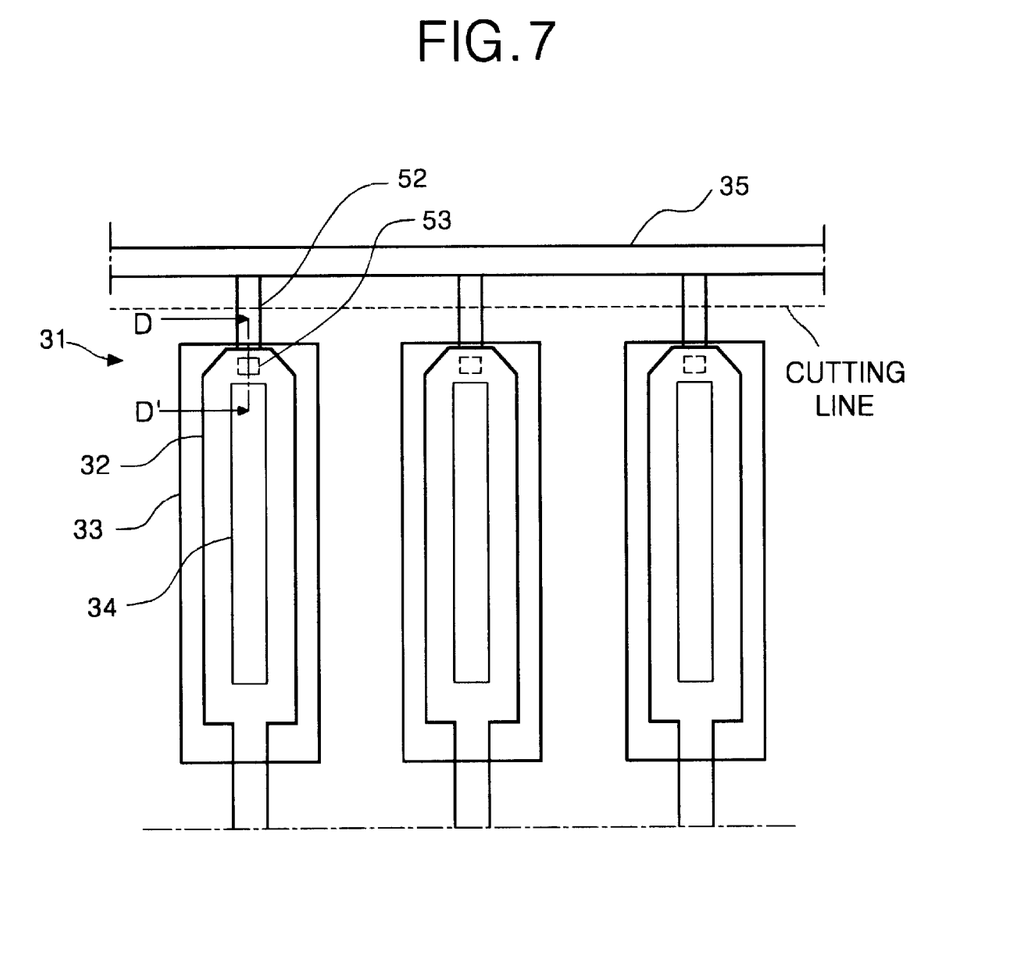
FIG. 7 is a plan view showing a structure of a pad and a shorting bar in a liquid crystal display device according to a second embodiment of the present invention.

Referring to FIG. 7, there is shown a liquid crystal display (LCD) device according to a second embodiment of the present invention. The LCD device includes a plurality of pads 31 connected to gate lines or data lines, and a poly silicon link pattern 52 connected between a shorting bar 35 and the pads 31. Each pad 31 includes a metal thin film pattern 32, and a transparent conductive pattern 33 patterned along with a pixel electrode. The metal thin film pattern 32 is patterned along with the source/drain electrode of the TFT and the data line connected to the source electrode. The metal thin film pattern 32 is connected, via a contact hole 53 defined in the gate insulating film 37, to the poly silicon link pattern 52. The transparent conductive pattern 33 is connected, via a contact hole 34 defined in a passivation layer, to the metal thin film pattern 32.

The shorting bar 35 is connected to a ground voltage source GND during the fabrication process to be responsible for removing a static electricity applied to the liquid crystal display panel. The shorting bar 35 is formed from a metal at the edge portion of the lower substrate 21 corresponding to a non-display area. By the substrate scribing process and the grinding process, the shorting bar 35 is removed simultaneously when an unnecessary area at the edge of the lower substrate 21 is removed.

The poly silicon link pattern 52 allows the shorting bar 35 to be electrically connected to the pad at an equal potential, thereby preventing a generation of static electricity from the pad 31. Also, the poly silicon link pattern 52 plays a role to prevent a corrosion beginning at the shorting bar 35 from being progressed into the metal thin film pattern 32 of the pad 31, thereby shutting off a corrosion path.

Figure 8:
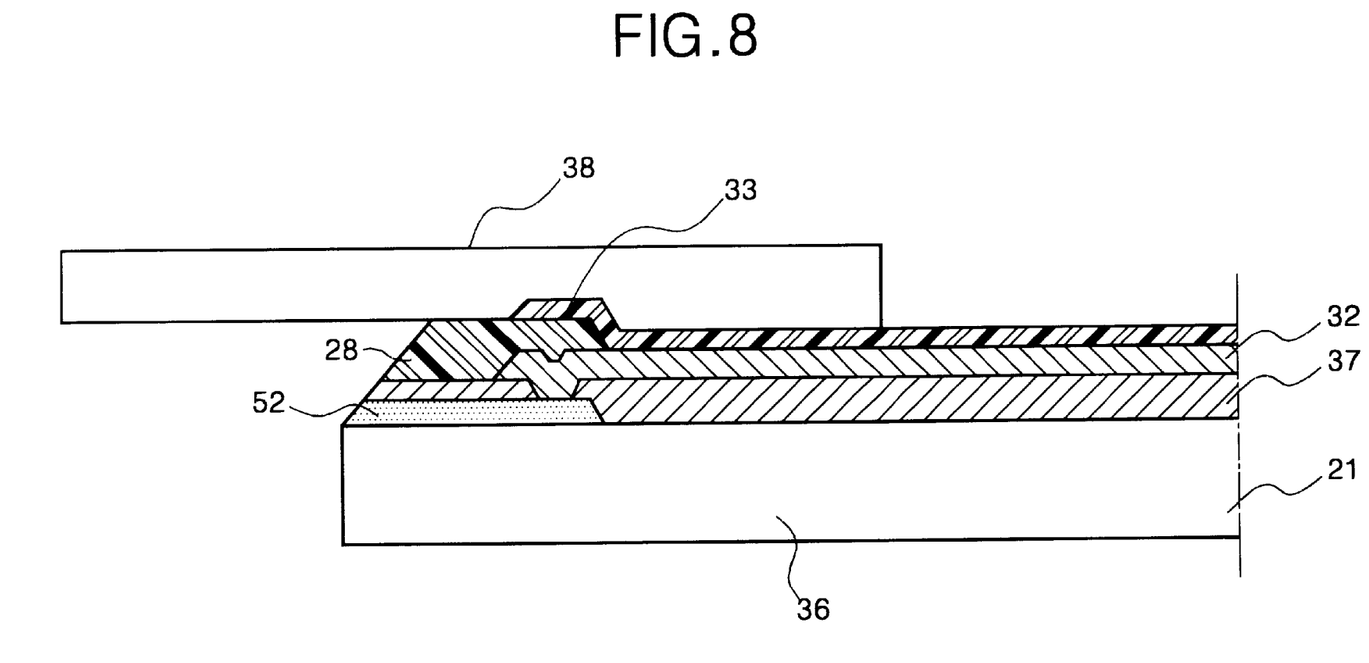
FIG. 8 is a section view of the pad and the shorting bar taken along the D–D' line in FIG. 7.

As shown in FIG. 8, a tape carrier package (TCP) 38 is attached to the pad 31 after the substrate scribing process and the grinding process. At a ground face 36 existing in the side surface of the lower substrate 21 to which the TCP 38 is attached, only an insulating material layer of the gate insulating film 37 and the passivation layer 28 and the poly silicon link pattern 52 are exposed. Accordingly, the metal thin film pattern 32 of the pad is not exposed to the air, so that a corrosion of the metal thin film pattern 32 can be prevented under the high temperature and high humidity circumference.

As described above, according to the present invention, the poly silicon link pattern, instead of the metal wire, is provided between the pad exposed at the edge of the substrate and the driver IC positioned within the substrate adhesion area (or the driver IC patterned on the substrate). Further, the poly silicon link pattern is provided between the shorting bar exposed at the edge of the substrate and the pad to which the TCP is attached. Accordingly, the poly silicon link pattern having a non-corrosion property, instead of the metal wire, is provided at the exposed portion in the air, so that it becomes possible to prevent a corrosion of the metal wire generated during a long-term use under the high temperature and high humidity circumference as well as a corrosion of the metal wire at the inside of the panel transferred through the exposed metal wire.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device wherein a liquid crystal pixel cell are provided between a gate line and a data line, said device comprising:

a pad positioned at a non-display area of a substrate to be connected to at least one of the gate line and the data line;

a driving circuit for responding to an electrical signal from the pad to drive the liquid crystal pixel cell provided within said non-display area of the substrate; and a semiconductor pattern opposed to the driving circuit with having the pad therebetween to be connected between the pad and the driving circuit.

2. The liquid crystal display device according to claim 1, wherein the driving circuit is a driver integrated circuit connected to the gate line to drive the gate line.

3. The liquid crystal display device according to claim 1, wherein the driving circuit is a driver integrated circuit connected to the data line to drive the data line.

4. The liquid crystal display device according to claim 1, wherein the semiconductor pattern is formed from a poly silicon layer.

5. A liquid crystal display device wherein a liquid crystal pixel cell are provided between a gate line and a data line, said device comprising:

a plurality of pads connected to at least one of the gate line and the data line provided within a display area of a substrate; and a semiconductor pattern opposed to the gate line and the data line with having the pad therebetween and connected to the pad, said semiconductor pattern having one end exposed at the side surface of the substrate.

6. The liquid crystal display device according to claim 5, further comprising:
a shorting bar connected to the semiconductor pattern upon fabrication process of the liquid crystal display device to apply a ground voltage to the gate line and the data line, wherein said shorting bar is removed by a scribing process.

7. The liquid crystal display device according to claim 5, wherein the semiconductor pattern is formed from a poly silicon layer.

8. The liquid crystal display device according to claim 5, wherein the pads are connected to output pads of a tape carrier package mounted with a driver integrated circuit chip.

9. A method of fabricating a liquid crystal display device wherein a liquid crystal pixel cell are provided between a gate line and a data line, said method comprising the steps of:
forming a pad at a non-display area of a substrate in such a manner to be connected to at least one of the gate line and the data line;
forming a driving circuit for responding to an electrical signal from the pad to drive the liquid crystal pixel cell provided within said non-display area of the substrate on the substrate; and
forming a semiconductor pattern opposed to the driving circuit with having the pad therebetween to be connected between the pad and the driving circuit on the substrate.

10. The method according to claim 9, wherein the driving circuit is a driver integrated circuit connected to the gate line to drive the gate line.

11. The method according to claim 9, wherein the driving circuit is a driver integrated circuit connected to the data line to drive the data line.

12. The method according to claim 9, wherein said step of forming the semiconductor pattern includes:
forming a poly silicon layer on the substrate; and
patterning the poly silicon layer.

13. A method of fabricating a liquid crystal display device wherein a liquid crystal pixel cell are provided between a gate line and a data line, said method comprising the steps of:
forming a plurality of pads on a substrate in such a manner to be connected to at least one of the gate line and the data line provided within a display area of a substrate; and
forming a semiconductor pattern opposed to the gate line and the data line with having the pad therebetween and connected to the pad and having one end exposed at the side surface of the substrate on the substrate.

14. The method according to claim 13, further comprising the steps of:
forming a shorting bar pattern connected to the semiconductor pattern to apply a ground voltage to the gate line and the data line at the edge of the substrate; and
cutting the substrate along a cutting line set at the inside of the edge of the substrate provided with the shorting bar pattern to thereby remove the shorting bar pattern.

15. The method according to claim 13, wherein said step of forming the semiconductor pattern includes:
forming a poly silicon layer on the substrate; and
patterning the poly silicon layer.

16. The method according to claim 13, wherein the pads are connected to output pads of a tape carrier package mounted with a driver integrated circuit chip.

* * * * *